United States Patent
Gilman

[11] 3,722,929
[45] Mar. 27, 1973

[54] HUB-CORE ASSEMBLY

[75] Inventor: Samuel Gilman, West Los Angeles, Calif.

[73] Assignee: Terminal Data Corporation, Van Nuys, Calif.

[22] Filed: Jan. 20, 1971

[21] Appl. No.: 107,914

[52] U.S. Cl. .......................... 287/53 SS, 242/68.3
[51] Int. Cl. ................................................ F16d 1/06
[58] Field of Search ............ 287/53 SS, 52.04, 52.05; 242/68.3, 68.1, 46.21

[56] References Cited

UNITED STATES PATENTS

| | | | |
|---|---|---|---|
| 691,759 | 1/1902 | George et al. | 287/2 |
| 3,456,892 | 7/1969 | Krambein et al. | 242/68.3 |
| 1,803,995 | 5/1931 | Chilton | 287/53 SS |
| 1,397,530 | 11/1921 | Lubeck | 287/52.05 UX |
| 2,466,097 | 4/1949 | Grave | 287/52.05 |
| 2,089,168 | 8/1937 | Brown | 287/52.05 |
| 2,900,202 | 8/1959 | Thompson | 287/52.04 |

*Primary Examiner*—Andrew V. Kundrat
*Attorney*—Harry R. Lubcke

[57] ABSTRACT

A hub-core assembly in which nominal deformation of a radial projection upon the hub serves to removably secure the surrounding core to the hub. The projection engages a slot in the core and is circumferentially deformed by such engagement. The projection is formed with a small angle with respect to the axis of rotation of the hub. The projection may have a central open slit to facilitate resilient deformation focushioning the assembly during rapid starts and stops.

3 Claims, 6 Drawing Figures

Patented March 27, 1973

3,722,929

INVENTOR
SAMUEL GILMAN
BY Harry R. Lubeke
AGENT

HUB-CORE ASSEMBLY

BACKGROUND OF THE INVENTION

The invention pertains to a hub-core assembly in which cores are selectively placed upon a hub for rotational purposes.

In the field of motion pictures, or in any other field in which an elongated tape is wound or unwound upon a suitable core or reel, it is usual to employ a dismountable relationship between the carrier of the tape and the hub which drives the tape in normal operation.

Some mode of fastening the core to the hub is required. This has involved the classical spring-loaded deflectable extension of the shaft with an ordinary key upon the shaft as used for 35 mm motion picture apparatus. Also, certain key and plural slot relationships between the driving and the driven members have been used.

For handling rolls of newsprint upon a press conical mandrels urged within the tubular core carrying the paper have employed radial deformation of ribs upon the mandrels.

In other instances angle arms coactive with circumferentially long slots have been used for driving a core in one direction.

SUMMARY OF THE INVENTION

By disposing at least one radial projection upon the outer surface of a rotatable hub at an angle to the axis of rotation, circumferentially, and also at an angle to plural slots upon the inner surface of a surrounding core having these slots parallel to the axis of rotation of the hub-core assembly, a highly desirable tight mechanical coupling is obtained by merely joining the hub and core together. The radial projections are deformed toward parallelism with the axis of rotation of the hub. Additionally, one or more longitudinal open-ended slits may be formed along the length of each radial projection to make it more easily deformable. Such deformation cushions against "jerk" of the film upon rapid starts and stops.

DESCRIPTION OF THE PREFERRED EMBODIMENTS

The significant aspect of this invention has to do with the physical and stress relationship between interlocking members of the hub and core when these elements are assembled in use. This relationship is particularly pertinent when rapid starts and stops are frequent, as in computer-related operation.

Figure 1:
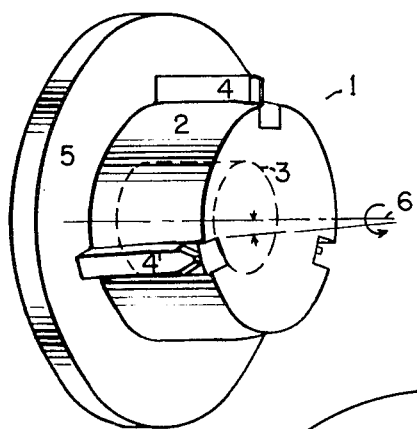
FIG. 1 is a perspective view of a typical hub according to this invention.

In FIG. 1 hub 1 has an essentially cylindrical portion 2. This is provided with a central hole 3 for attachment to a shaft of a whole apparatus (not shown). The hole may or may not extend all the way through the hub. Three radial projections, 4, 4', etc., are indicated in FIG. 1, two being seen and the third being behind the hub in this view. These are shown of the insert type, with the projection formed separately and inserted in grooves in the hub portion 2. A rear backing-flange 5 is also shown. This may or may not be included, depending upon the particular use to which the hub is put.

Figure 2:
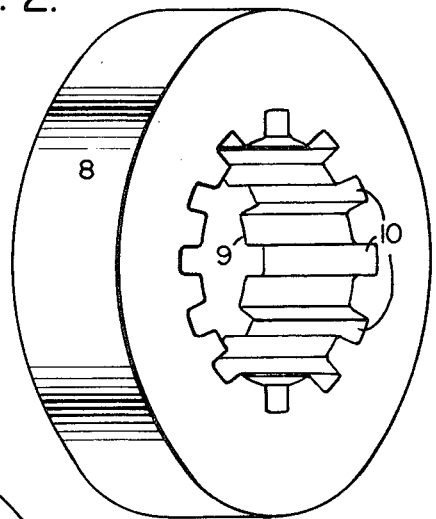
FIG. 2 is a perspective view of a typical core according to this invention.
Figure 3:
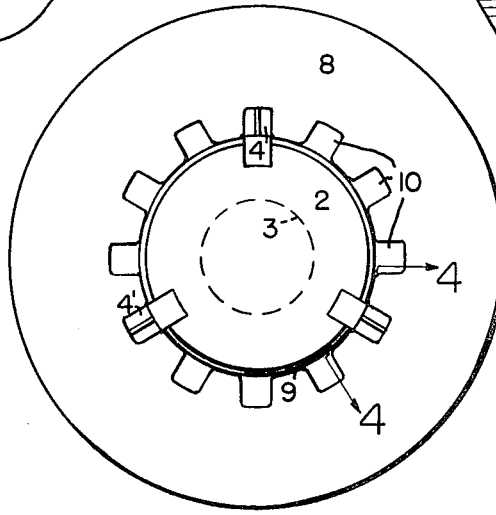
FIG. 3 is a front elevation view of the assembled hub and core.

In FIG. 2, core 8 has a central aperture 9 having an internal diameter slightly larger than the external diameter of the essentially cylindrical portion 2 of the hub. Plural slots 10 are peripherally disposed around the aperture. These are normally equally spaced and are normally greater in number than the number of projections 4 on the hub. For three projections a multiple of three slots is typical, such as 12 shown. This allows quick joining of hub and core, since a required mating circumferentially is easily established. On the other hand, only one projection and one slot may be used, as in film processing techniques.

The outer diameter of core 8 is determined by the application involved. A pair of sides (not shown) may be fastened on each side of the core to form a reel.

Figure 4:
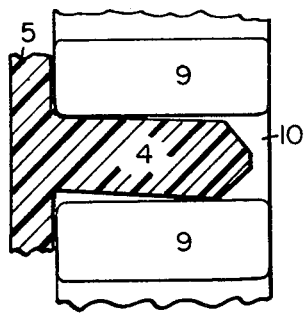
FIG. 4 is an enlarged detail of one projection and one slot with the hub and core assembled.

The detailed view of FIG. 4, at a larger scale than the prior figures, shows how projection 4 is disposed at an angle to the axis of rotation of hub 1. Typically, the axis of rotation 6 (see FIG. 1) is coincident with the axis of cylindrical part 2 thereof and also of cylindrical core 8 when the assembly is completed. The angle for the projection is selected to be within the range of from 2° to 15° under usual circumstances. A preferred value depends upon the stiffness of the material of the projection and its angle of friction. The value is selected to be less than the angle of friction to provide a locking effect between the hub and core after these elements have been assembled by the application of an outside force.

The fit between a projection 4 and a slot 10, as well as the general fit between portion 2 of the hub and aperture 9 of the core, are sufficiently close so that the projection cannot be moved all the way into the slot without the projection being deformed. This tends to "straighten" the projection; i.e., to deform it circumferentially of the whole structure toward parallelism with the axis of rotation 6. This deformation is non-destructive and moreover is within the elastic limit of the material of the projection so that it will resume its original position upon disassembly of the hub and core.

Figure 5:
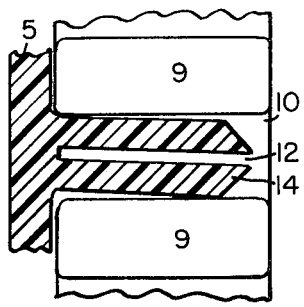
FIG. 5 is the same as FIG. 4, but with one open slit in the projection.
Figure 6:
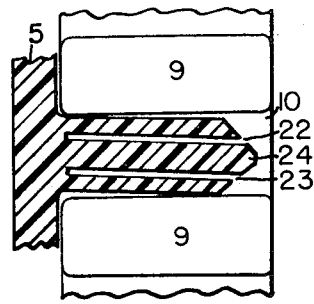
FIG. 6 is the same as FIG. 4, but with two open slits in the projection.

In FIGS. 4, 5, and 6, projections 4, 14 and 24 are shown as integral with the rest of the material of hub 1. This is an alternate embodiment with respect to the insert construction of FIG. 1.

In order to possess and retain required resilience projections 4 are formed of a suitable material, including plastics such as nylon, delrin, polycarbonates, polyurathanes and laminated or foamed plastic materials. The material delrin provides a part of long life in use. The whole hub 1, including the projections 4 may be formed of these materials. Alternately, as shown in FIG. 1, the projections 4, 4', etc. may be formed of a plastic and inserted in a hub of metal such as aluminum, or of some other plastic. Relatively deep slots are provided in the hub for this type of construction and the projections are a force fit, with an adhesive as well, if desired.

Materials other than plastics may be used for the projections, such as spring steel, spring bronze or beryllium-copper, but a plastic is preferred for the dynamic operation of rapid starts and stops since the deformation is then dissipative, or "lossy." This disposes of the rotational energy and does not require that it be dealt with subsequently as a rebound.

Projections 4 may be pointed, rounded and/or reduced in radial diameter to allow easy mating of the same with slots 10 in the core. Note FIGS. 1, 4, 5 and 6.

A projection 14 may be made more resilient by providing an open slit 12 along the length thereof, as shown in FIG. 5. In the unassembled state the slit is open, with parallel sides. When the hub-core assembly is made the slit is compressed, at least slightly. A further compression takes place during rapid acceleration or deceleration to further contribute to the cushion effect of the simple deformation of FIG. 4. These arrangements give quiet operation, as well.

FIG. 6 shows a further alternate arrangement of two slits 22 and 23 in a projection 24. Upon assembly and/or acceleration or deceleration one of the thin sides of the projection deflects inwardly. If the stress is greater the main body 24 is also caused to deflect.

In FIGS. 5 and 6 slits 12, 22 and 23 are shown in a non-compressed position for clarity of illustration. When actually engaged in slots 10 the open ends of each are typically partially closed in the static condition and completely closed in the dynamic condition of rapid start or stop.

The shapes of the locking parts of the assembly of this invention are such as to provide rugged structures. Thin hook-like projections are not required, nor are separate spiral metallic springs, such as might become detatched and lost.

I claim:

1. A hub for rotating a core comprising;
    (a) a cylindrical rotatable hub (1) having at least one circumferentially deformable integral radially-projecting projection (4),
    disposed at an angle to the axis of rotation (6) of said hub less than the frictional angle for the materials used, and (b) at least one slit (12) formed along the full length of each said projection (4) and open at only one end.

2. The hub of claim 1 in which said slit is centrally disposed along said projection.

3. The hub of claim 1 which includes two open slits (22,23) formed in and along substantially the full length of said projection (4).

* * * * *